(12) United States Patent
Kawakatsu

(10) Patent No.: US 6,242,862 B1
(45) Date of Patent: Jun. 5, 2001

(54) PHOTOCATALYZER AND LAMP OR LIGHTING FIXTURE HAVING A PHOTOCATALYZER

(75) Inventor: Akira Kawakatsu, Kanagawa-ken (JP)

(73) Assignee: Toshiba Lighting and Technology Corporation, Tokyo (JP)

( * ) Notice: Subject to any disclaimer, the term of this patent is extended or adjusted under 35 U.S.C. 154(b) by 0 days.

(21) Appl. No.: 09/219,902

(22) Filed: Dec. 24, 1998

(30) Foreign Application Priority Data

Dec. 26, 1997 (JP) .................................................. 9-359651
Mar. 31, 1998 (JP) ................................................ 10-085825
Jun. 26, 1998 (JP) ................................................ 10-181000

(51) Int. Cl.[7] .............................. H01J 17/16; H01J 61/30; H01J 61/35; H01J 1/62; H01J 63/04

(52) U.S. Cl. ........................... 313/634; 313/635; 313/493

(58) Field of Search .................................... 313/493, 573, 313/634, 635, 158, 461, 466, 477 R, 479; 422/186, 186.3; 250/503.1; 359/512, 507, 509; 445/11, 12, 13, 14, 26

(56) References Cited

U.S. PATENT DOCUMENTS 5,854,708  *  12/1998  Komatsu et al. ..................... 359/512
6,024,929  *  2/2000  Ichikawa et al. ..................... 422/186

FOREIGN PATENT DOCUMENTS 0 737 513   10/1996  (EP) .

OTHER PUBLICATIONS

Database WPI, Section Ch, Week 9808, Derwent Publications Ltd., London, GB; Class A82, AN 98–080761, XP002099827 & JP 09 313948 A (Nippon Parkerizing Co Ltd), Dec. 9, 1997, * abstract * .
Database WPI, Section Ch, Week 9737, Derwent Publications Ltd., London, GB; Class D22 AN 97–397666, XP002099828 & JP 09 173865 A (Toshiba Lightech KK), Jul. 8, 1997, * abstract * .
Database WPI, Section Ch, Week 9901, Derwent Publications Ltd., London, GB; Class A89, AN 99–003987, XP002099829 & JP 10 278168 A (Honda Access KK), Oct. 20, 1998, * abstract *.
Database WPI, Section Ch, Week 9808, Derwent Publications Ltd., London, GB; Class L03, AN 98–080750, XP002099830 8 JP 09 313934 A (Toshiba Lightech KK), Dec. 9, 1997, * abstract *.

* cited by examiner

Primary Examiner—Nimeshkumar D. Patel
Assistant Examiner—Mack Haynes
(74) Attorney, Agent, or Firm—Pillsbury Winthrop LLP

(57) ABSTRACT

This invention provides a photocatalytic membrane and a lamp and lighting fixture using such a membrane. The membrane is formed using an ultra fine particle dispersed liquid coating method providing improved adhesion of the membrane to a base body and provides a photocatalyzer that has a satisfactory light transmission factor and a lamp and a lighting fixture using it. The membrane is made of mainly ultra fine particles of titanium oxide, which enter into the uneven surface portions of a ground layer and are closely fitted thereto via the ground layer made of a metallic oxide with an uneven surface formed on the surface is formed on the base body. When the ground layer is made of metallic oxide and porous, the uneven surface is formed on the surface of the ground layer. Concave portions of the ground layer may be penetrated to the surface of the base body or a metallic oxide structural layer provided with a lot of penetrating holes may be formed on the surface of a photocatalytic membrane. Silicon oxide, titanium oxide and aluminum oxide are usable as a metallic oxide.

5 Claims, 15 Drawing Sheets

PHOTOCATALYZER AND LAMP OR LIGHTING FIXTURE HAVING A PHOTOCATALYZER

INCORPORATION BY REFERENCE

This application incorporates the subject matter of Japanese Patent Applications 10-181000 filed Jun. 26, 1998; 9-359651 filed Dec. 26, 1997; and 10-85825 filed Mar. 31, 1998 as if fully set forth herein.

BACKGROUND OF THE INVENTION

1. Field of the Invention

The present invention relates to a photocatalyzer, and to a lamp and a lighting fixture using the photocatalyzer.

2. Description of Related Art

It is known to use a photocatalytic membrane for removing odor, preventing contamination and for antibacterial use. When a photocatalytic membrane receives and absorbs ultraviolet rays, photocatalytic action takes place. The membrane is ionized and generates electrons and holes. These electrons and holes react with oxygen and moisture present on the surface of the membrane, generate active oxygen and other active radicals, and oxidize and reduce constituents of contaminants that may cause odors, such as organic matter and the like.

At this time it appears that the most promising material that can be used on an industrial scale that exhibits photocatalytic action is titanium oxide. Titanium oxide has remarkable photcatalytic action and is available at reasonable prices in industrial quantity. Titanium oxide is available in two different crystal structures: rutile type and anatase type. The anatase type crystal of titanium oxide has excellent photocatalytic action.

Due to the perceived usefullness of a photocatalytic membrane, there have been efforts to form a photocatalytic membrane on a wide range of products such as building materials, lighting fixtures, lamps, etc. There are various known methods for manufacturing a photocatalytic membrane. Two such methods are the so-called dipping method and a method in which ultra fine particles are dispersed in a liquid used for coating.

The so-called dipping method forms a photocatalytic membrane by coating a base body with a liquid containing titanium alkoxide and baking it at 400~500° C. The photocatalytic membrane obtained according to this method is durable because it has excellent membrane strength.

The ultra fine particle dispersed liquid coating method forms a photocatalytic membrane by applying a water soluble dispersed liquid with such photocatalytic ultra fine particles as titanium oxide dispersed in water and isopropyl alcohol to a base body and baking it. A photocatalytic membrane formed by this manufacturing method has a high crystallization and has excellent photocatalytic properties.

It is difficult to form a high quality photocatalytic membrane using the so-called dipping method. Unless it is incinerated at a high temperature for a long time, the crystallization of the surface is insufficient and its photocatalytic characteristic is low. When the base body is made of a soft glass such as a soda lime glass, the glass has a softening temperature that is relatively low. Thus, the glass cannot be incinerated at a sufficient temperature to achieve the desired photocatalytic characteristic.

When the photocatalytic membrane is formed according to the above-mentioned manufacturing method, there is also a problem in that the transmission factor for visible light is diminished. This is due to light interference action generated from a difference in refractive indexes of the glass and photocatalytic membrane. The refractive index of the photocatalytic membrane made of mainly titanium oxide is larger than that of glass.

In order to solve these problems associated with the dipping method, the applicant previously proposed a method to reduce a refractive factor of a photocatalytic membrane so that it is almost equal to that of glass, which is used as the base body. This was done by adding a metallic oxide such as silica in the photocatalytic membrane. The details of this attempt are set forth in Japanese Patent Application No. 9-140372, the subject matter of which is incorporated herein by reference as if fully set forth herein. As described in that patent application, it was possible to prevent the drop of the visible rays transmission factor by adding metallic oxide so as to lower the refractive index of the photocatalytic membrane and prevent the generation of interference color. However, an unfortunate side effect of this procedure was that the photocatalytic action also drops somewhat.

On the other hand, when the photocatalytic membrane is formed according to the so-called dipping method to attach a coating liquid to a base body by dipping it in a coating liquid containing such organic titanium compound as titanium alkoxide, titanium alkoxide and high boiling point organic compound causes hydrolysis with moisture in the air when pulling the base body out of the coating liquid. However, moisture does not readily arrive at the base body side and the hydrolysis at the base body side is insufficient and is not completely evaporated during the heating process at the time of calcination and is thermally cracked and scattered via such intermediate product as hydrocarbon. Therefore, it was revealed that impurities such as carbon increases in the photocatalytic membrane which tends to be reduced and titanium oxide in the photocatalytic membrane tends to become a rutile crystal that is partially inferior in the photocatalytic action. Thus the photocatalytic action of an obtained photocatalytic membrane tends to drop.

On the other hand, in the ultra fine particles dispersed liquid coating method, the obtained photocatalytic membrane generally has a high crystallization and excellent photocatalytic characteristic but there are problems. Adherence to the main body is not sufficient and when an organic bonding agent is used, this bonding agent tends to cause cracks. When the bonding agent cracks, the transmission factor may drop due to cloudiness.

SUMMARY OF THE INVENTION

Accordingly, a primary object of the present invention is to provide a photocatalyzer that has both good photocatalytic action and a good photo transmission factor and does not generate an interference color. A further objective is to provide lamps and lighting fixtures using such a photocatalyzer.

Another object of the present invention is to improve adhesion of the photocatalytic membrane to its main body by improving the formation of the photocatalytic membrane using the ultra fine particles dispersed liquid coating method.

A photocatalyzer according to the invention has a base body. A ground layer comprising metallic oxide is formed on the base body. This ground layer has a base body side and a free surface side. The free surface side has the uneven surface. A photocatalytic membrane is formed on the uneven surface of the ground layer. This photocatalytic membrane is made principally of fine particles of titanium oxide and is formed closely fitting to concave portions of the uneven surface of the ground layer.

The base body is a carrier for the photocatalytic membrane. It can be arranged so that its sole purpose is provide a carrier for the photocatalytic membrane. Or, the base body could have some other function while also being a convenient carrier for the photocatalytic membrane. For example, it could be a structural material, such as tile, window glass, ceiling panel, etc., kitchen and sanitary equipment, home electric equipment, lighting equipment, odor removing or dust collecting filter. The base body could be made of metal, glass, ceramics including porcelain, pottery, china, stone, synthetic resin and wood. When forming a photocatalytic membrane through the calcination, the base body must have a heat resistance to withstand that calcination.

The photocatalytic membrane is not applied directly to the base body but is formed on a ground layer that is formed on the base body. The ground layer is made of a metallic oxide and is provided with an uneven free surface on which the photocatalytic membrane can be formed. The ground layer, being made of a metallic oxide, is generally transparent, congenial to the photocatalytic membrane that is made of mainly titanium oxide and can be fastened solidly to the base body by the calcination.

The ground layer can be provided with its uneven surface by any suitable means. One way to provide the uneven surface is to form the ground layer using a metallic oxide wherein metallic particles having an average that is larger than that of ultra fine particles comprising the photocatalytic membrane are dispersed. One suitable way to form the ground layer is by applying a dispersed liquid containing metallic oxide particles in an average particle size 30~200 nm in mix to the base body and baking it at 80~300° C.

It is possible to select a metallic oxide having a refractive index smaller than that of the photocatalytic membrane for forming the ground layer. Thus, it becomes possible to achieve a refractive index inclined structure by forming a ground layer having a refractive index between a base body having a small refractive index likewise a soda lime glass and the photocatalytic membrane having a large refractive index. By this inclined refractive index structure, it becomes possible to make a difference in refractive indexes between mutually contacting layers and suppress the generation of the light interference.

The principal constituent of the photocatalytic membrane material is titanium oxide $TiO_2$. Titanium oxide has remarkable photocatalytic action, is safe and is available at industrially rational prices in required quantity and is regarded to be the most promising photocatalytic material at present. Titanium oxide is available in two kinds of crystal structure; rutile type and anatase type. The anatase type has much better photocatalytic action than does the rutile type.

It is suitable to use the anatase type titanium oxide in the present invention. However, there are actually many cases where a photocatalytic membrane is formed using the anatase type titanium oxide mixed with the rutile type titanium oxide and even in this case, useful photocatalytic action can be achieved. Therefore, an embodiment using a titanium oxide comprising both types in mix is contemplated in this invention. Further, decomposability of organic matters changes depending on a mixing ratio of both types of titanium oxide.

Photocatalytic materials other than titanium oxide may be added as a sub-constituent in the photocatalytic membrane. Other photocatalytic materials are: $WO_3$, $LaRhP_3$, $FeTiO_3$, $Fe2O_3$, $CdFe_2O_4$, $SrTiO_3$, $CdSe$, $GaAs$, $GaP$, $RuO_2$, $ZnO$, $CdS$, $MoS_3$, $LaRhO_3$, $CdFeO_3$, $Bi_2O_3$, $MoS2$, $In_2O_3$, $CdO$, $SnO_2$, etc. One or more of these materials can be used in mix Further, $TiO_2$, $WO_3$, $SrTiO_2$, $Fe_2O_3$, $CdS$, $MoS_3$, $Bi_2O_3$, $MoS_2$, $In_2O_3$, and $CdO$ have an absolute value of oxidation-reduction potential at the equivalent zone larger than that at the transmission zone and therefore, have a larger oxidation power than a reduction power and are excellent in odor removing, contamination prevention or antibacterial action. With regard to raw material cost, $TiO_2$, $Fe_2O_3$ and $ZnO$ are excellent among the above-mentioned materials.

Titanium oxide is used in a form of ultra fine particles. Ultra fine particles are extremely fine particles in average particle size below 20 nm and desirably, in a shape close to a globular shape as could as possible, less variation in particle sizes and good crystallization.

The photocatalytic membrane material enters into the uneven surface of the ground layer and becomes closely fitted therewith. This structure can be formed easily, for instance, when the uneven surface is formed on the surface of the ground layer, a dispersed liquid of the photocatalytic membrane is applied on the ground layer, dried and baked.

Baking can be carried out at a temperature above 200° C., for instance, in a range of 300~600° C. To get ultra fine particles of titanium oxide to enter into the uneven surface of the ground layer, either a heating method or a mechanical pressing method or both of these methods can be used. One suitable heating method is to bake the ground layer at about 650° C. with the photocatalytic membrane placed upward, the ground layer becomes soft, ultra fine particles of titanium oxide sink by their own weight and enter into the ground layer. One suitable mechanical method is to apply pressure to the coated layer of the ultra fine particles of titanium oxide and push the ultra fine particles into the ground layer. In addition, a very small amount of silicon dioxide can be added into the photocatalytic membrane. Silicon dioxide can be used as a binding agent. Regardless of which methods are used, the uneven surface of the ground layer allows the photocatalytic membrane material to enter into surface portions of the ground layer and become closely fitted thereto. This allows for the production of a photocatalytic membrane having a high adhesive strength.

Because the photocatalytic membrane comprises mainly ultra fine particles of titanium oxide, its photocatalytic action is strong like a conventional photocatalytic membrane using ultra fine particles of titanium oxide. When a metallic oxide that has a refractive index smaller than that of the photocatalytic membrane, for instance, silicon oxide, aluminum oxide, is used as a metallic oxide for constituting the ground layer, the refractive index is decreased and the generation of light interference can be prevented. Thus, the light transmission factor of the photocatalytic membrane is improved and a transparent photocatalyzer is obtained.

The average depth of the uneven surface of the ground layer is 20~150 nm and the average particle size of the ultra fine particle size of titanium oxide is 1~20 nm, smaller than the average depth of the uneven surface.

The average depth of the uneven surface refers to a distance between the top most and the bottom most portions of the uneven surface. The average depth of the uneven surface is larger than the average particle size of ultra fine particles of titanium oxide. Therefore, the ultra fine particles at the lowest layer of titanium oxide constituting the photocatalytic membrane enter into the uneven surface of the ground layer and closely fit thereto, and the photocatalytic membrane is firmly adhered to the ground layer. The concave portion of the ground layer of the photocatalytic membrane penetrates to the surface of the base body and at least a part of the photocatalytic membrane is buried in the concave portion.

Regarding the ground layer, various means are usable for forming the concave portion penetrating the ground layer to the surface of the base body. For instance, by preparing a coating liquid with solid particles of an organic compound added to a liquid of such a metallic compound as metallic alkoxide to form a metallic oxide of the ground layer, diluted properly by a solvent, coating to the base body and baking, it is possible to form a concave portion in the above-mentioned structure after the particles of organic compound are decomposed. Further, particles of metallic oxide may be added to the above-mentioned liquid of metallic compound. The concave portion can be of any horizontal sectional shape, such as round, honeycomb, oval or any other shapes. The concave portion can be of any vertical sectional shape such as column, inverted cone, curved, bent or any other shapes.

The photocatalytic membrane may be formed using ultra fine particles of titanium oxide. It is buried almost in its entirety in the concave portion and accordingly, the convex portion of the ground layer may be in the state exposed to the surface of the photocatalytic membrane. However, the lower layer portion of the photocatalytic membrane mainly close to the base body is buried in the ground later and the upper layer portion may form the continuous layer on the ground layer.

A photocatalyzer constructed in accordance with the principles of the present invention has the following characteristics:

(1) The photocatalytic action is satisfactory. The high photocatalytic action is obtained by ultra fine particles having good crystallization.

(2) The strength of the photocatalytic membrane is large. As the concave portion penetrating to the surface of the base body is formed on the ground layer made of good adhesive metallic oxide and ultra fine particles of titanium oxide are buried in the concave portion, the photocatalytic membrane is satisfactorily adhesive and it becomes highly strong.

(3) The photocatalytic membrane has a high transmission factor. As a refractive index changes while inclining from the surface of the base body to the surface of the photocatalytic membrane, the light reflection is reduced between the glass base body and the photocatalytic membrane and the transmission factor of visible rays is improved. When the base body is manufactured using glass, a visible rays transmission factor larger than that of the glass body is obtained.

One embodiment of the photocatalyzer of the present invention will now be described. First, a base body is provided. A porous ground layer made of metal oxide is formed on the base body. A photocatalytic membrane made of mainly ultra fine particles of titanium oxide is formed on the ground layer by closely fitting to the ground layer. "Porous" refers to the porosity being more than 30% and preferably below 70%. Porosity is continuous and may be continuous from the surface of the ground layer to the surface of the base body or continuous to the middle of the ground layer. If the porosity is in excess of 70%, the strength of the ground layer drops remarkably and it is therefore desirable to restrict it to below 70%. When the ground layer is porous, its surface also becomes uneven and it becomes easy for fine particles of titanium oxide of the photocatalytic membrane to enter into the uneven surface and closely fit thereto. When the ground layer is porous, it becomes easy to contain moisture and wettability is improved, and adhesion of the photocatalytic membrane is promoted.

The photocatalyzer of the invention features a metallic oxide structural layer that has a plurality of penetrating holes on its surface. The metallic oxide structural layer covers the photocatalytic membrane while forming fine mesh-like spaces. There are various suitable means for forming many penetrating holes in the metallic oxide structural layer. For instance, in a similar manner to the way in which the ground layer is formed, it is possible to form the concave portions in the metallic oxide structural layer at places where organic compound particles were decomposed by adding solid organic compound particles to such a compound liquid as a metallic alkoxide that forms metallic compound, preparing a coating liquid properly diluted by solvent, applying it to the base body and baking It. Further, metallic oxide particles can be added to the above-mentioned metallic compound liquid. The horizontal and vertical sectional shapes of the penetrating holes can be in various shapes.

It is possible to provide a photocatalyzer in such a shape that the ground layer and the metallic oxide structural layer are directly connected or partially connected by permeating among ultra fine particles of the photocatalytic membrane. To get ultra fine particles of titanium oxide to enter into the penetrated holes, when the method of that invention is added, it becomes more certain to force the particles to enter into the holes.

The metallic oxide structural layer is thus formed on the photocatalytic membrane composed of ultra fine particles of titanium oxide while it is permeating between the ultra fine particles and therefore, the membrane strength of the photocatalytic membrane is promoted. Further, if the metallic oxide structural layer and the ground layer are connected, the membrane strength is further promoted.

Further, because many holes are formed on the metallic oxide structural layer, such organic materials as offensive materials, contaminants, bacteria, etc. are brought in contact with the photocatalytic membrane by passing through the holes and therefore, the photocatalytic action will never be impeded. By controlling sizes of spaces of the penetrated holes, it is also possible to compose the photocatalyzer so as not to allow contaminants in large particle sizes to pass through the holes.

Because many penetrated holes are formed in the metallic oxide structural layer, the difference of refractive index becomes small and the layer acts as a reflection preventive membrane. Accordingly, when the base body uses glass, the transmission factor of visible rays is improved more than the original glass by maximum 6~8%. Furthermore, the metallic oxide structural layer protects the surface of the photocatalytic membrane so that it is hardly damaged.

The photocatalyzer of the invention features a ground layer that comprises at least one kind of oxide of titanium Ti, silicon Si and aluminum Al. Any one of the metallic oxides defined in the present invention is able to form a transparent and satisfactory ground layer. Silicon and aluminum oxides have a smaller refractive index than that of the photocatalytic membrane and therefore, a difference with a refractive index of the base body is made small so that the light interference is hardly generated.

The ground layer is formed by silicon oxide and titanium oxide mixed at weight ratio 40:60~80:20. When silicon oxide and titanium oxide are mixed at weight ratio in the above-mentioned range, it is possible to adjust a refractive index to a desired level and obtain stronger adhesion.

When fine particles of titanium oxide are mixed with silicon oxide and baked, it is possible to have silicon oxide to act as a binder and form a ground layer that has a satisfactory adhesion to the base body. By using titanium oxide in average particle size larger than that of fine particles of titanium oxide of the photocatalytic membrane, for instance, 30~200 nm, an uneven surface of average depth 20~150 nm can be easily formed on the surface of the ground layer.

To form a ground layer in such structure, prepare and apply a liquid coating of silicon oxide that is diluted in organic solvent of silicon compound such as polysiloxane to the base body and bake it. At this time, disperse titanium oxide in a desired particle size in the liquid coating.

The lamp according to the invention includes a lamp body of which luminous portion is enclosed by a glass bulb and emits light of wavelength 400 nm or below; and the photocatalyzer that is formed at least on the outer surface of the glass bulb.

The lamp of the present invention ignores the principle of light emission and for instance, incandescent lamps, discharge lamps are usable. In the case of an incandescent lamp, a halogen lamp of a high color temperature has a higher light emitting ratio at a wavelength below 400 nm than a general electric lamp. In the case of a discharge lamp, both low-tension discharge lamps and high-tension discharge lamps are usable. As a low-tension lamp, there is a fluorescent lamp. It is possible to properly increase the light emission at 400 nm or below by selecting a fluorescent material that is used for fluorescent lamp. In case of such a fluorescent lamp, the drop of visible rays is relatively less and the activating action of the photocatalyzer is satisfactory more than general lighting fluorescent lamps and therefore, it is best suited to a photocatalyzer activating lamp. However, this invention allows fluorescent lamps using three wavelength light emitting fluorescent material or calcium fluorescent material typically used for general lighting. Sterilizing lamps, black lights and chemical lamps for utilizing mainly luminescence below 400 nm are also permitted. Mercury lamps, metal halide lamps and high-tension sodium lamps are usable as high-tension discharge lamps. A glass bulb can be such a type that it encircles a discharge medium or an external tube that encircles a luminous tube containing in the present a luminous body.

The photocatalytic membrane is formed using a glass bulb of lamp as the base body, the photocatalytic membrane can be activated sufficiently even when the volume of luminescence generated by a lamp is below 400 nm. When the lamp of the present invention is used, nicotine from cigarettes and organic contaminants such as soot and smoke adhered to the glass bulb are decomposed by the photocatalytic action. Stains formed on the glass bulb that would otherwise decrease luminous flux, decrease. Therefore, a good illumination is assured for a long period of time and the cleaning intervals of a lamp can be extended.

Heat generated by lighting the lamp, is convected and causes air around the lamp to be circulated. Air contacting the lamp is deodorized and sterilized. It is therefore possible to deodorize and sterilize the room air using the lamp of the present invention.

The lighting fixture according to the invention comprises a main body of a lighting fixture equipped with a light control means. A photocatalyzer is formed on at least a part of the fixture, such as the light control means or the main body of the lighting fixture. The lighting fixture can be either for the outdoor or indoor use. The light control means can be a combination of one or more kinds of reflectors, globes, translucent covers and louvers. The photocatalytic membrane can be formed on the entirety of the light control means or a part of it. If contaminants comprising such organic materials as soot and smoke, nicotine of cigarettes, etc. are adhered to the light control means when used, its optical performance as a lighting fixture drops. However, if the photocatalytic membrane is formed, contaminants are decomposed and the drop of the optical performance can be suppressed.

By decomposing and sterilizing offensive materials in the air contacting the light fixture, it is possible to deodorize and sterilize a room. By making a lighting fixture of such a size and shape that can be put into a refrigerator, an air conditioner, an air cleaner, etc. and incorporating it into such equipment, it is also possible to use a lighting fixture according to the present invention as an odor removing or sterilizing device.

As can be understood from the above explanation, the photocatalytic membrane is formed on the light control means, a transparent photocatalytic membrane is suited.

The photocatalyzer comprises a base body and a photocatalytic membrane comprising titanium oxide as a principal constituent added with a metallic oxide and coated to the base body, wherein content of metallic oxide at the base body side is much more than it is at the surface side. It is possible to form the photocatalytic membrane that is principally made of titanium oxide by baking a base body coated by a liquid containing titanium alkoxide and when a manufacturing method includes such a calcination process, the base body must be a material durable to a baking temperature.

In the present invention it is a required condition that the photocatalyzer is in a structure that metallic oxide is added to the photocatalytic membrane and its content is much more in the photocatalytic membrane at the base body side than that at the surface side. There are various methods available to achieve this structure. For instance, it is sufficient to form the photocatalytic membrane in two or more layers, increase the content of metallic oxide in the photocatalytic membrane at the base body side and decrease that at the surface side.

Even when the photocatalytic membrane is formed in a single layer, it is possible to construct the photocatalyzer of the present invention by changing the distribution of metallic oxide content in the layer in the direction of membrane thickness. The following describes one suitable method.

A desired metallic compound is added to a coating liquid containing titanium alkoxide. The liquid is used to coat the base body. The coated base body is then baked which generates titanium oxide and metallic oxide by hydrolyzing titanium compound and metallic compound contained in a coating liquid with moisture in the air and generate titanium oxide and metallic oxide is used. To change the content of metallic oxide in the direction of membrane thickness, the decomposition of metallic compound is made faster than that of titanium compound and also, solubility is of hydrolyzed titanium and metal in the gel state into a solvent is reduced. Further, although the adding amount of metallic oxide somewhat varies according to which type of oxide and solvent are used, a proper amount is 10~50 wt % against titanium oxide in the photocatalytic membrane. If the adding amount is less than 10 wt %, the exudation preventive action of sodium is not sufficient and if exceeding 50 wt %, the visible rays transmission factor will drop.

Further, it is possible to obtain a coating liquid using ultra fine particles of titanium oxide having the good dispersibility in solvent instead of titanium alkoxide and by dispersing it directly in solvent.

Thus, the photocatalyzer of the present invention has less content of silica at the surface side of the photocatalytic membrane and a desirable photocatalytic action can be obtained without reducing it by silica. On the contrary, as a content of silica at the base body side is relatively high and therefore, even when a refractive index of the base body is relatively small like glass containing sodium, it is possible to bring this refractive index close to this refractive index of glass, and therefore, the reflection on the surfaces between the base body and photocatalytic membrane decreases, reduction of a transmission factor of rays decreases and an interference color becomes less. At the same time, much silica at the surface side suppress the leaching of sodium and therefore, the crystal structure of titanium oxide is not damaged.

The metallic oxide in the photocatalyzer is at least a kind of oxide of silicon Si and aluminum Al. The present invention defines metals of metallic oxides definitely that are added into the photocatalytic membrane. In short, both silicon and aluminum oxides can be added.

The photocatalyzer comprises a base body and a photocatalytic membrane that is principally made of titanium oxide obtained by coating a liquid containing titanium alkoxide to a base body and baking it and added with at least a kind of metallic oxide selected from a group of aluminum Al, tin Sn and tantalum Ta.

The titanium alkoxide generates titanium oxide by hydrolysis with moisture in the air when baked. Organic compound in a coating liquid tends to remain in a non-reaction product, intermediate product and photocatalytic membrane, and is not completely evaporated in the temperature rising process during the baking. Thus, thermal cracking and scattereing due to such intermediate products as hydrocarbon and, therefore, are reduced. As a result, the membrane tends to partially form the rutile crystal.

However, in the present invention, added metallic oxide prevents crystallization of titanium oxide during the baking. So, the obtained photocatalytic member contains much titanium oxide of anatase type crystal and exhibits excellent photocatalytic action.

The ground layer comprising principally metallic compound containing OH can be formed on the surface of the base body before forming the photocatalytic membrane. That is, when forming the photocatalytic membrane by applying a coating liquid containing titanium alkoxide and barking it, the titanium alkoxide and moisture in the air are hydrolyzed as mentioned above. However, because the reaction first takes place on the outer surface of the coated membrane, moisture in the air hardly arrives at the titanium alkoxide in the vicinity of the interface with the base body and the hydrolysis tends to become insufficient. As a result, impurities such as carbon increase near the interface and the state of the photocatalytic membrane thereon becomes worse and the photocatalyzer action becomes worse, accordingly. Furthermore, as the degree of above-mentioned trouble is varied largely by the change in atmospheric humidity, fluctuation of the obtained photocatalytic membrane becomes large.

When the grounding layer in the above-mentioned structure is provided, OH is supplied from the grounding layer to the coated membrane near the interface at the base body side and contributes to the hydrolysis and the non-reaction near the interface is improved and as a result, the membrane quality is promoted and a high photocatalyzeric property is obtained. In addition, it is hardly affected by the atmospheric humidity and the fluctuation of the photocatalytic membrane becomes small.

A grounding layer comprising principally silica ($SiO_2$) is pointed out desirable as the content of OH is 3~30 wt % of metallic oxide and the membrane is 10~300 nm.

The photocatalytic membrane may have a refractive index of 2.0 or below at wavelength 550 nm. The refractive index of the photocatalytic membrane is selected such that the visible light transmission factor doesn't drop much. When forming a photocatalytic membrane on a glass base body in accordance with the principles of the present invention, it is possible to obtain a photocatalyzer that has a more satisfactory transmission factor of rays and doesn't produce interference color. This is accomplished by making the refractive factor of the photocatalytic membrane at the base body side nearly equal to that of the glass and further, making the refractive factor at the surface side as large as possible in the above-mentioned range.

Various embodiments of the invention will be described in detail with reference to the following drawings.

BRIEF DESCRIPTION OF THE DRAWINGS

The invention will be described in more detail below with reference to the following figures.

Throughout the various figures, like reference numerals designate like or corresponding parts or elements. Duplicative description will be avoided as much as possible.

DETAILED DESCRIPTION OF THE INVENTION

Preferred embodiments of the present invention will be described referring to the attached drawings.

Figure 1:
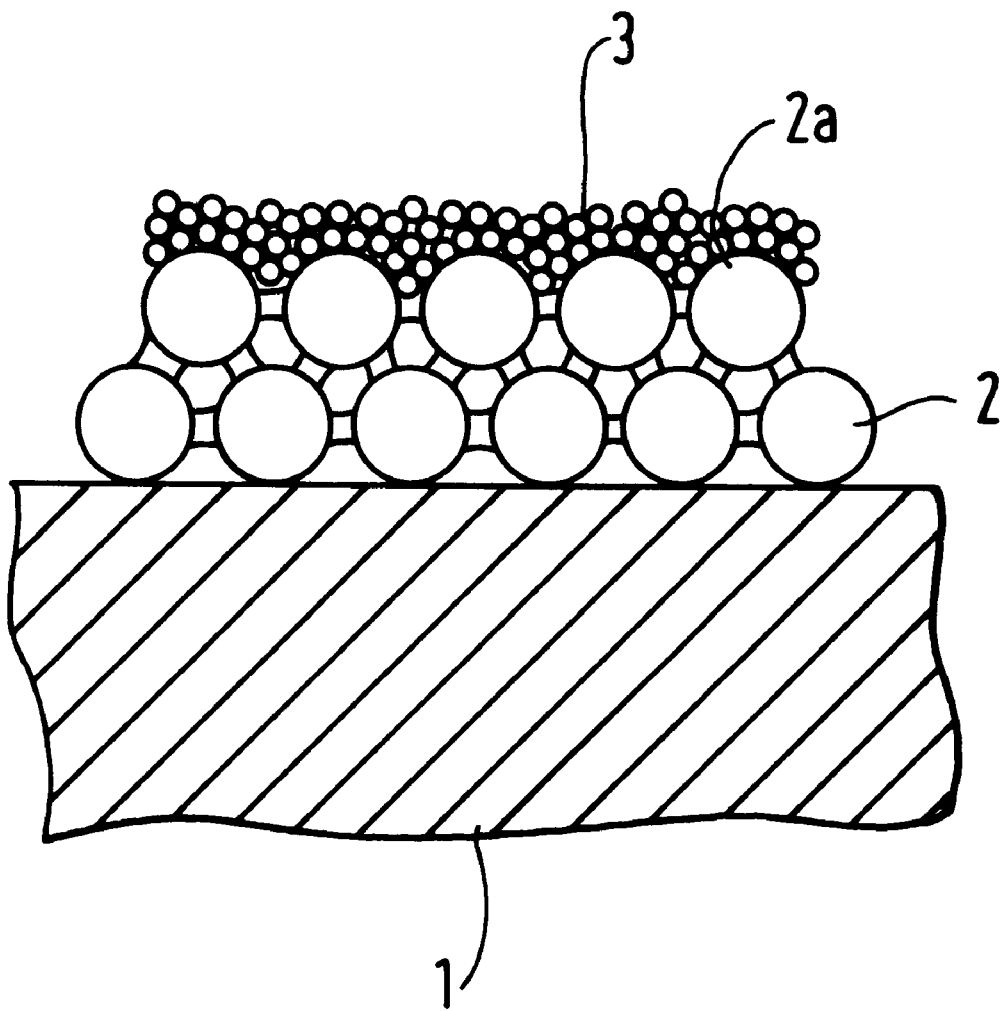
FIG. 1 is a conceptually detailed portion of an enlarged sectional view of a first embodiment of a photocatalyzer according to the present invention.

A first embodiment of the present invention will be explained with reference to FIGS. 1 to 3.

A base body 1 supports a ground layer 2. A photocatalytic membrane 3 is formed over ground layer 2. The base body 1 is preferably made of a soda lime glass. However, other suitable materials could be used. Ground layer 2 is a transparent and porous membrane made of a mixture of silicon oxide and titanium oxide mixed so as to have substantially a weight ratio 60:40 with an uneven surface 2a and arranged to have an average depth of about 30 nm formed on its surface. Ground layer 2 is formed in such a manner that a coating liquid with polysiloxane solved in ethanol and titanium oxide particles in average particle size about 30 nm dispersed is prepared, coated to the surface of the base body 1, dried and baked at about 200° C.

The photocatalytic membrane 3 is formed by adhering ultra fine particles of titanium oxide having an average particle size 7 nm to the surface of the ground layer 2. This photocatalytic membrane 3 enters into the uneven surface 2a formed on the surface of the ground layer 2 and closely adheres to the ground layer 2.

Figure 2:
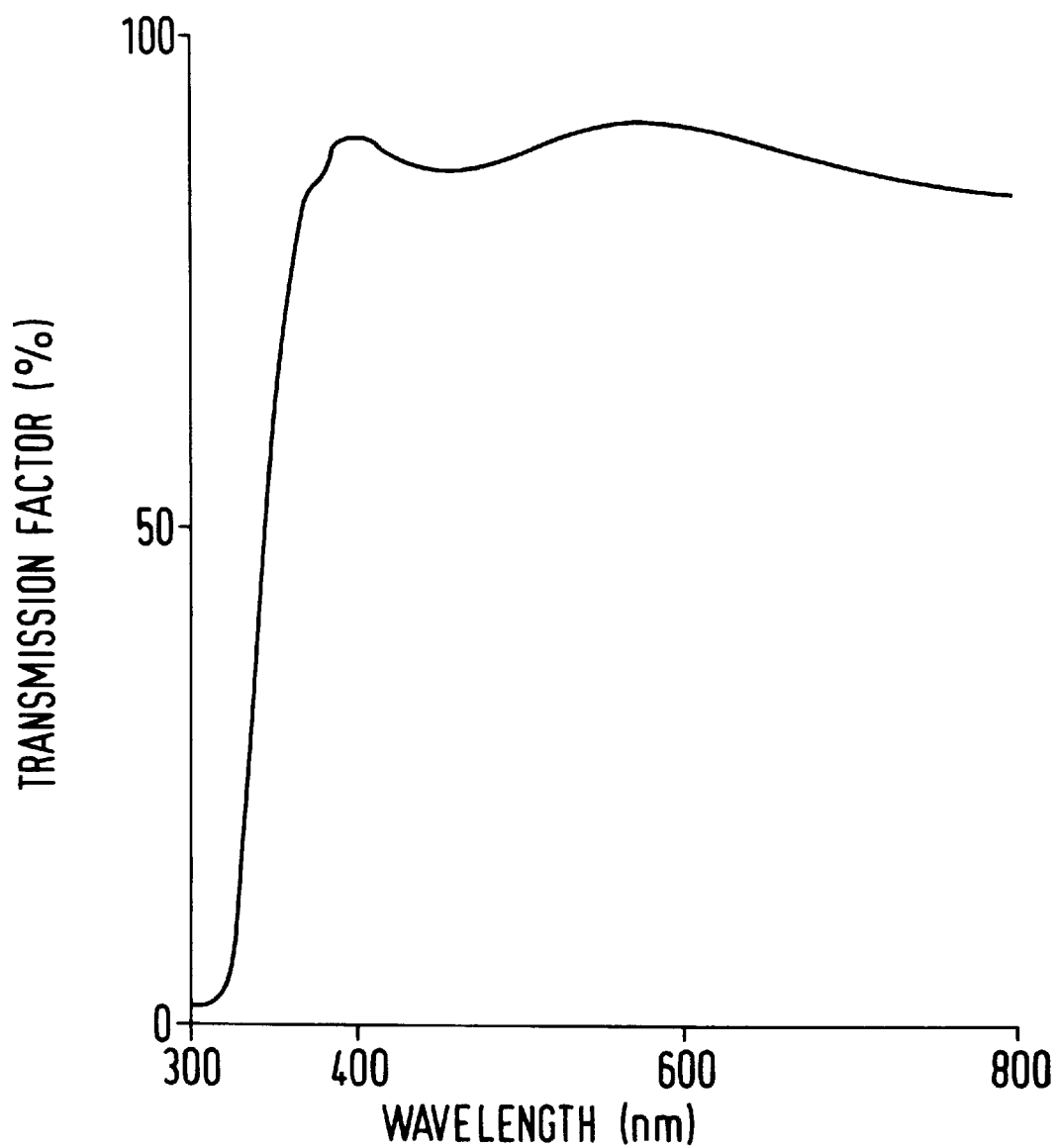
FIG. 2 is a graph showing the spectral transmission factor characteristic of the photocatalytic membrane of the photocatalyzer according to the first embodiment of the present invention.

FIG. 2 is a graph showing the spectral transmission factor characteristic of the photocatalytic membrane in the first embodiment of the photocatalyzer of the present invention. The x-axis indicates wavelength (nm) and the y-axis indicates transmission factor (%). The curve indicates the spectral transmission factor characteristic of the photocatalytic membrane in this embodiment. As shown, the transmission factor in the visible rays and ultraviolet area is close to 100% according to this embodiment.

Figure 3:
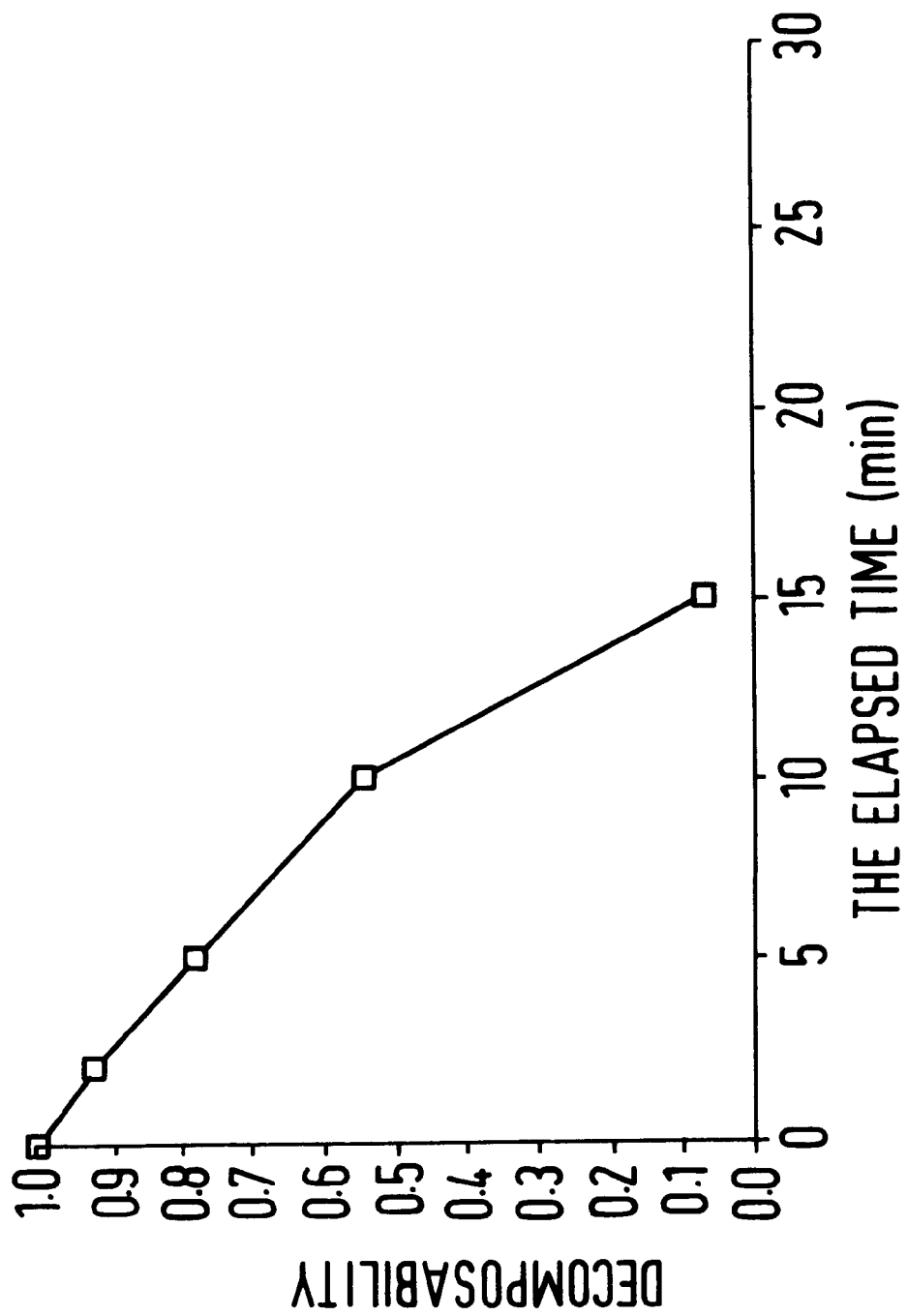
FIG. 3 is a graph showing the measured result of the ink decomposability of the photocatalyzer of the present invention in the first embodiment.

FIG. 3 is a graph showing the measured result of ink decomposability in the first embodiment of the photocatalyzer of the present invention. The x-axis indicates the elapsed time (minute) and the y-axis indicates the decomposability (%). The curve indicates the ink decomposability in this embodiment. As clearly seen in this figure, the photocatalytic action is excellent. A hardness test of the photocatalytic membrane of the photocatalyzer of this embodiment was conducted according to the pencil method and the hardness was 6~7H. This test result shows that a photocatalytic membrane that has a sufficiently high strength is obtained according to the present invention.

Figure 4:
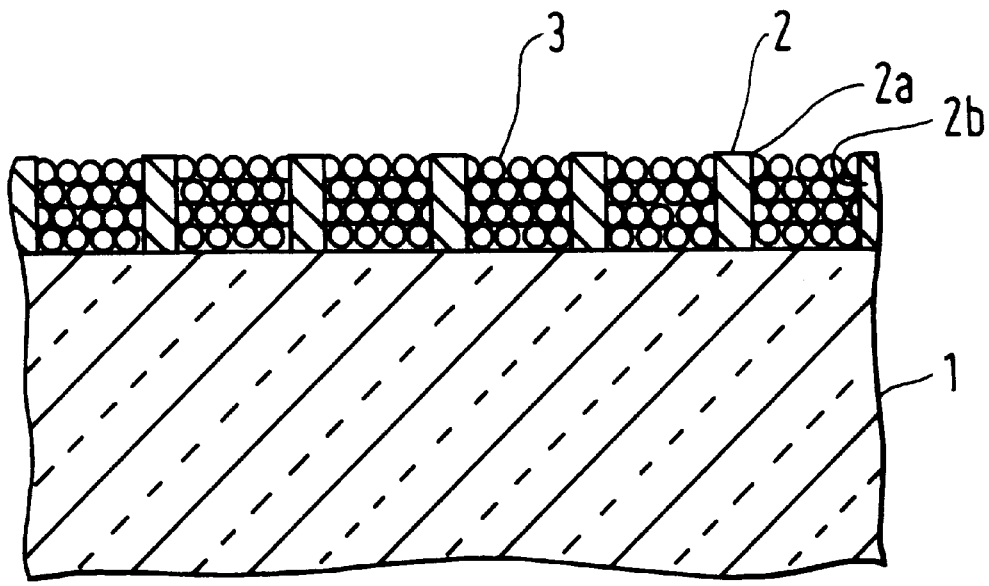
FIG. 4 is a conceptual essential part enlarged sectional view of a second embodiment of the present invention.

FIG. 4 is a conceptual essential part expanded sectional view showing the photocatalyzer according to a second embodiment of the present invention.

Figure 5:
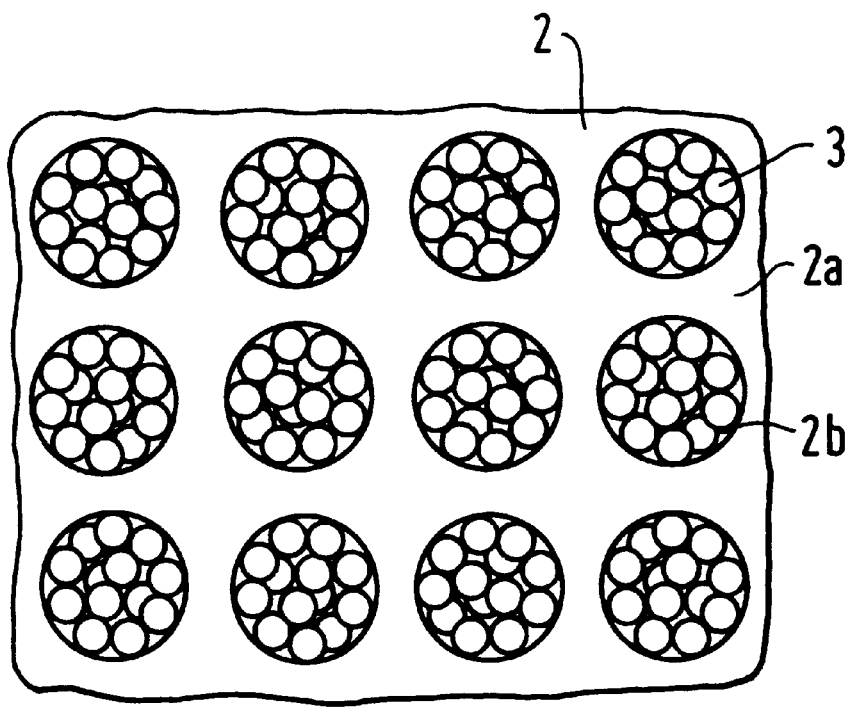
FIG. 5 is a conceptual essential part enlarged plan view of the second embodiment.

FIG. 5 is a conceptual essential part expanded plan view of the second embodiment. Elements like or corresponding to those already described in FIG. 1 will not be described. This embodiment differs from the first embodiment in that the concave portions 2b that are formed on the uneven surface 2a of the ground layer 2 penetrate the ground layer to the surface of the base body 1.

Ground layer 2 is manufactured according to the following steps.

A coating liquid with epoxy resin particles in diameter above an aimed thickness of membrane added to silicon compound such as polysiloxane is prepared and applied to the surface of the glass made base body 1. Then, the base body is baked at a temperature above 400° C. Epoxy resin particles are decomposed and vanish in this process. Thus, the concave portions 2b penetrating to the surface of the base body are formed on the empty holes produced when epoxy resin is vanished on the obtained ground layer 2. The horizontal and vertical sectional shapes of these concave portions 2b are shown in the column shape in the figure but they may take various shapes depending on shape, added quantity, etc. of epoxy resin; however, in any shape, the actions and effects of the present invention are obtained. When the ground layer 2 of the base body 1 is formed, a liquid with ultra fine particles which are about 10 nm in particle size of about of anatase type titanium oxide dispersed in a solution of water and isopropyl alcohol is prepared and applied to the surface of the ground layer 2. Then, the base body 1 is baked at 300~600° C. The titanium oxide particles are buried in the concave portions 2b and the photocatalytic membrane 3 is formed. The photocatalytic membrane 3 formed as described above is a very hard membrane that has hardness 8H~9H and shows a high visible rays transmission factor and excellent photocatalytic action as shown below.

Figure 6:
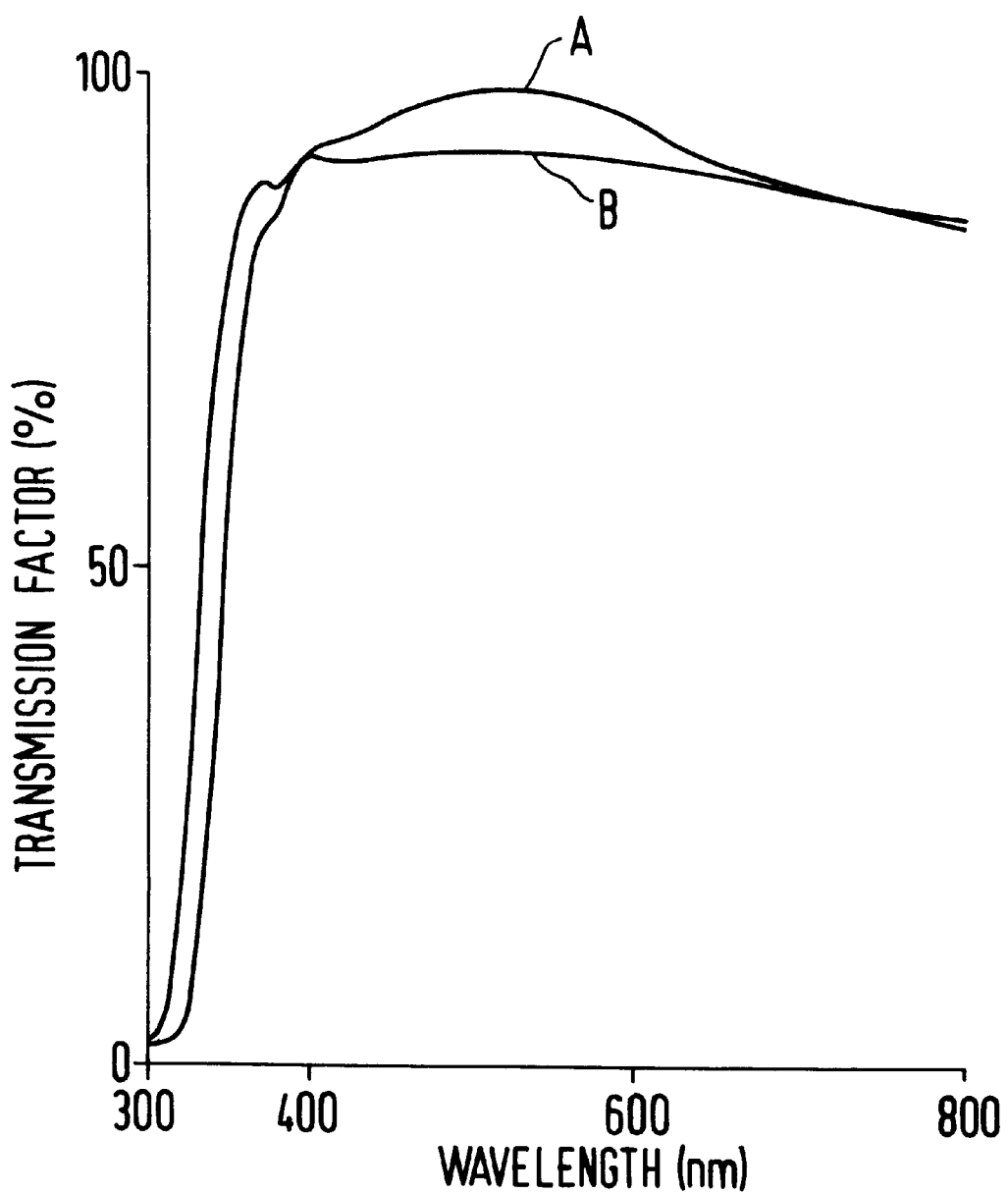
FIG. 6 is a graph showing the spectral transmission factor characteristic of the photocatalyzer according to the second embodiment of the present invention.

FIG. 6 is a graph showing the spectral transmission factor characteristic of the photocatalyzer according to the second embodiment together with that of a comparison example. The x-axis indicates wavelength (nm) and the y-axis indicates transmission factor (%). Curve A indicates the transmission factor characteristic of this embodiment and the curve B indicates that of the comparison example. The comparison example shows the characteristic of a glass made base body only. As clearly seen from the figure, a transmission factor higher than the glass made base body in the comparison example by 6~8% is obtained especially in the visible rays area in this embodiment.

Figure 7:
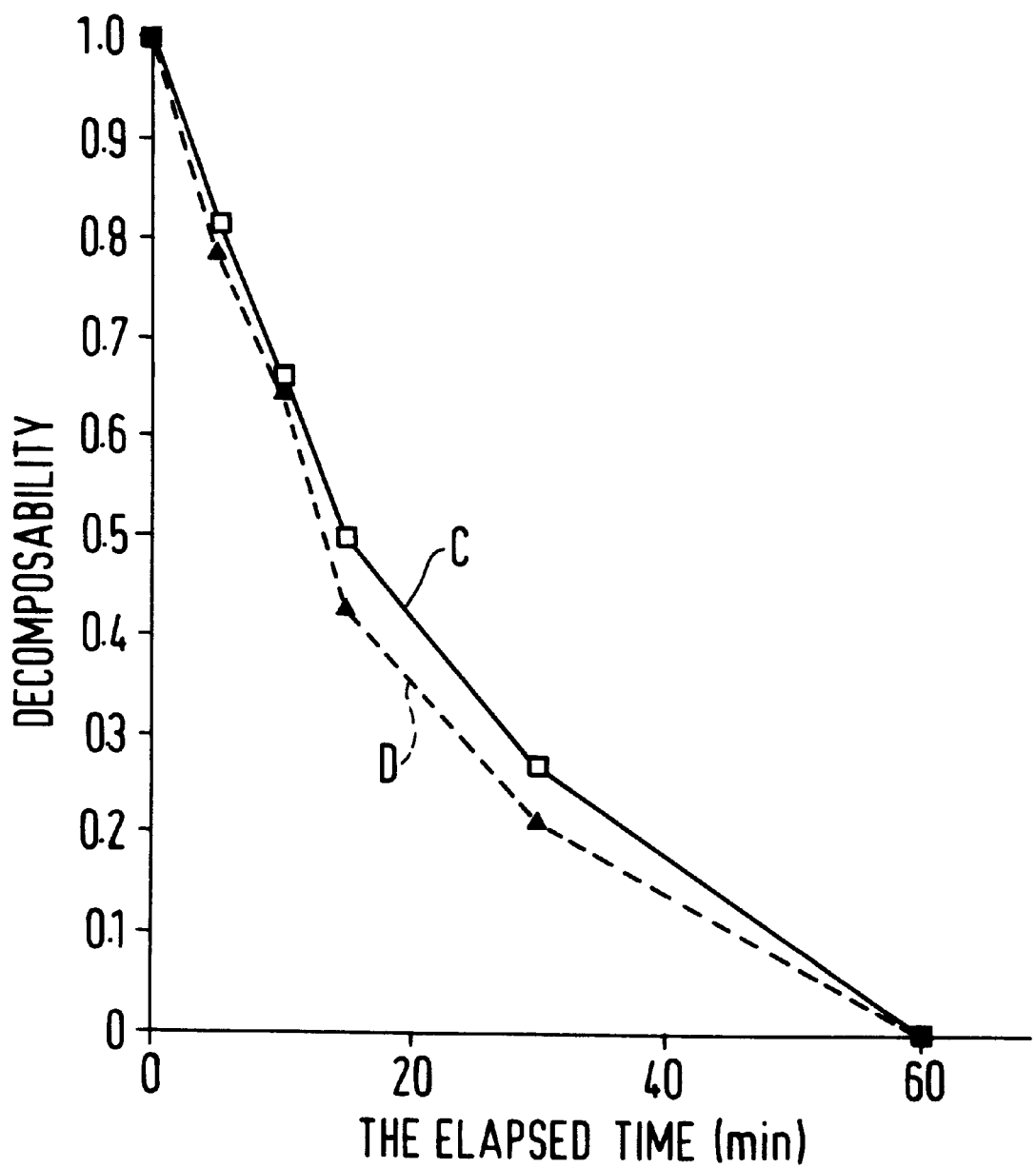
FIG. 7 is a graph showing the measured result of the ink decomposability of the photocatalyzer according to the second embodiment of the present invention.

FIG. 7 is a graph showing the measured result on the ink decomposability of the photocatalyzer according to the second embodiment and that of the comparison example. The x-axis indicates elapsed time (minute) and the y-axis indicates decomposability. Curves C and D indicate the ink decomposability of this embodiment and that of the comparison example, respectively. Further, shown in the comparison example is a conventional photocatalyzer using ultra fine particles of titanium oxide. As clearly seen from the figure, the photocatalytic action is almost the same as a conventional photocatalyzer using ultra fine particles of titanium oxide.

A third embodiment of the photocatalyzer that is in the same structure as the photocatalyzer in the structure shown in FIG. 3 and FIG. 4 but manufactured in different steps will now be described. A coating liquid is prepared by mixing titanium oxide in particle size about 50 nm in a solution of polysiloxane dissolved in ethanol at weight ratio 50:50 and applied to the base body 1. When the base body 1 is baked at 80~300° C., the about 100 nm thick ground layer 2 is formed. The uneven surface 2a that is deeper than 20 nm is formed on the surface of the ground layer 2 and the concave portions 2b reaching the surface of the base body 1, that is, the concave portions 2b penetrating to the surface of the base body 1 are formed at the considerable rate.

A coating liquid with ultra fine particles of mainly anatase type titanium oxide in about 10 nm particle size dispersed in a mixture of water and isopropyl alcohol is applied to the surface of the ground layer 2, baked at 300~600° C. to form the photocatalytic membrane 3. Thus, the photocatalyzer that has the photocatalytic membrane entered into the concave portions 2b penetrating to the surface of the base body of the ground layer 2 can be obtained.

Figure 8:
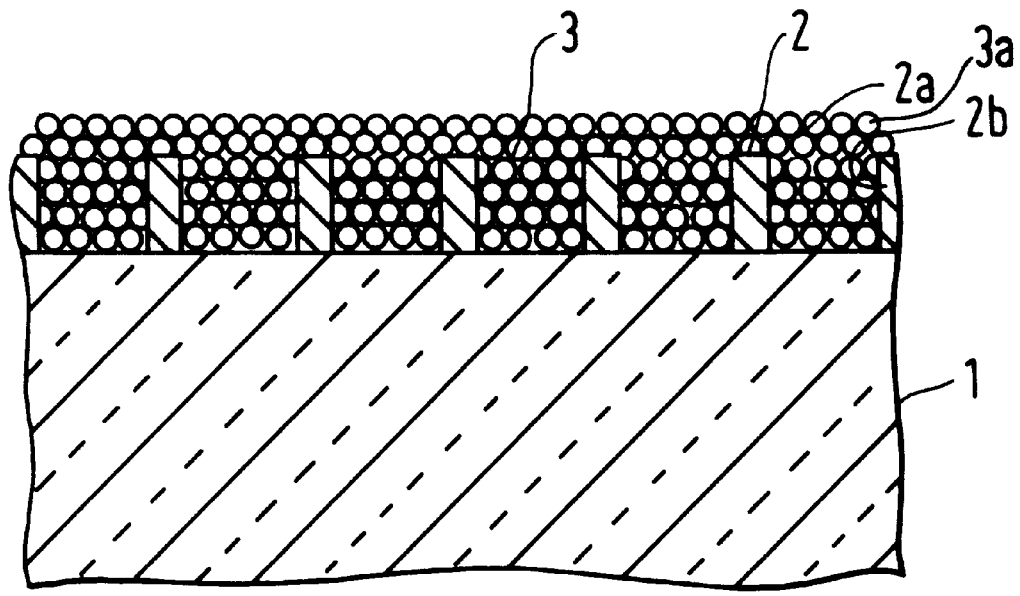
FIG. 8 is a conceptual essential part enlarged sectional view showing the third embodiment of the photocatalyzer of the present invention.

FIG. 8 is a conceptual essential part enlarged section view showing a third embodiment of the photocatalyzer of the present invention. The same elements as those shown in FIG. 4 are assigned with the same reference numerals and the explanations thereof will be omitted. This embodiment differs in that the photocatalytic membrane 3 forms the continuous membrane portion 3a not only in the concave portions 2b of the ground layer 2 but also on the concave portions 2b.

Figure 9:
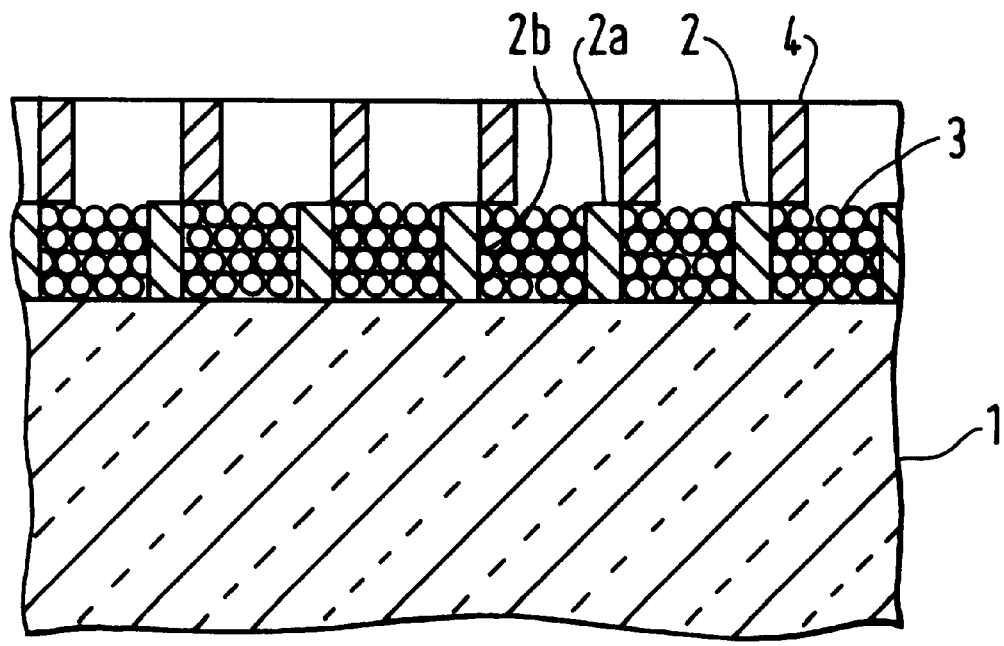
FIG. 9 is a conceptual essential part enlarged sectional view showing the fourth embodiment of the photocatalyzer of the present invention.
Figure 10:
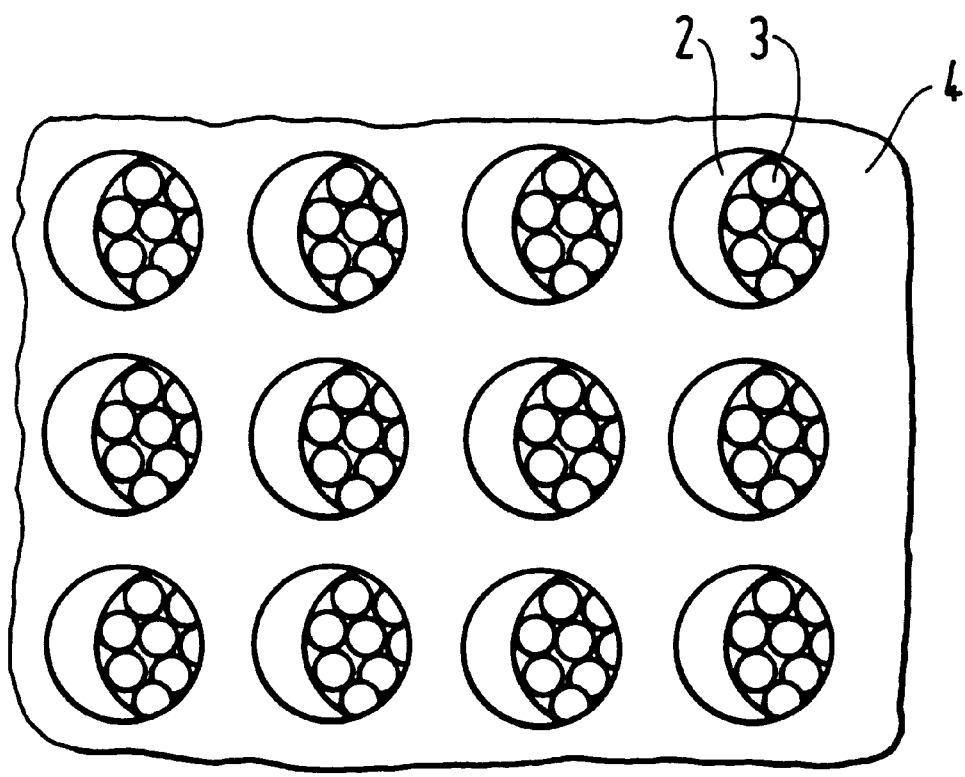
FIG. 10 is a conceptual essential part enlarged plan view of the fourth embodiment.

FIG. 9 is a conceptual essential part enlarged sectional view showing the fourth embodiment. FIG. 10 is a conceptual essential part enlarged plan view showing the same. In the above figures, the same elements as those shown in FIG. 4 are assigned with the same reference numerals and the explanations thereof will be omitted. This embodiment differs in that the metallic oxide structural layer 4 is further formed on the photocatalytic membrane 3. That is, the metallic oxide structural layer 4 is provided with the penetrating concave portions 4a likewise the ground layer 2 and the photocatalytic membrane 3 is able to contact the open air via the concave portions 4a. Further, the metallic oxide structural layer 4 can be formed in the same manner as the ground layer 2 after forming the photocatalytic membrane 3. The photocatalytic membrane 3 is sandwiched by the ground layer 2 and the metallic oxide structural layer 4 and therefore, the adhesive strength is improved. At this time, if the ground layer 2 and the metallic oxide structural layer 4 are partially adhered to each other, the adhesive strength is further improved.

Figure 11:
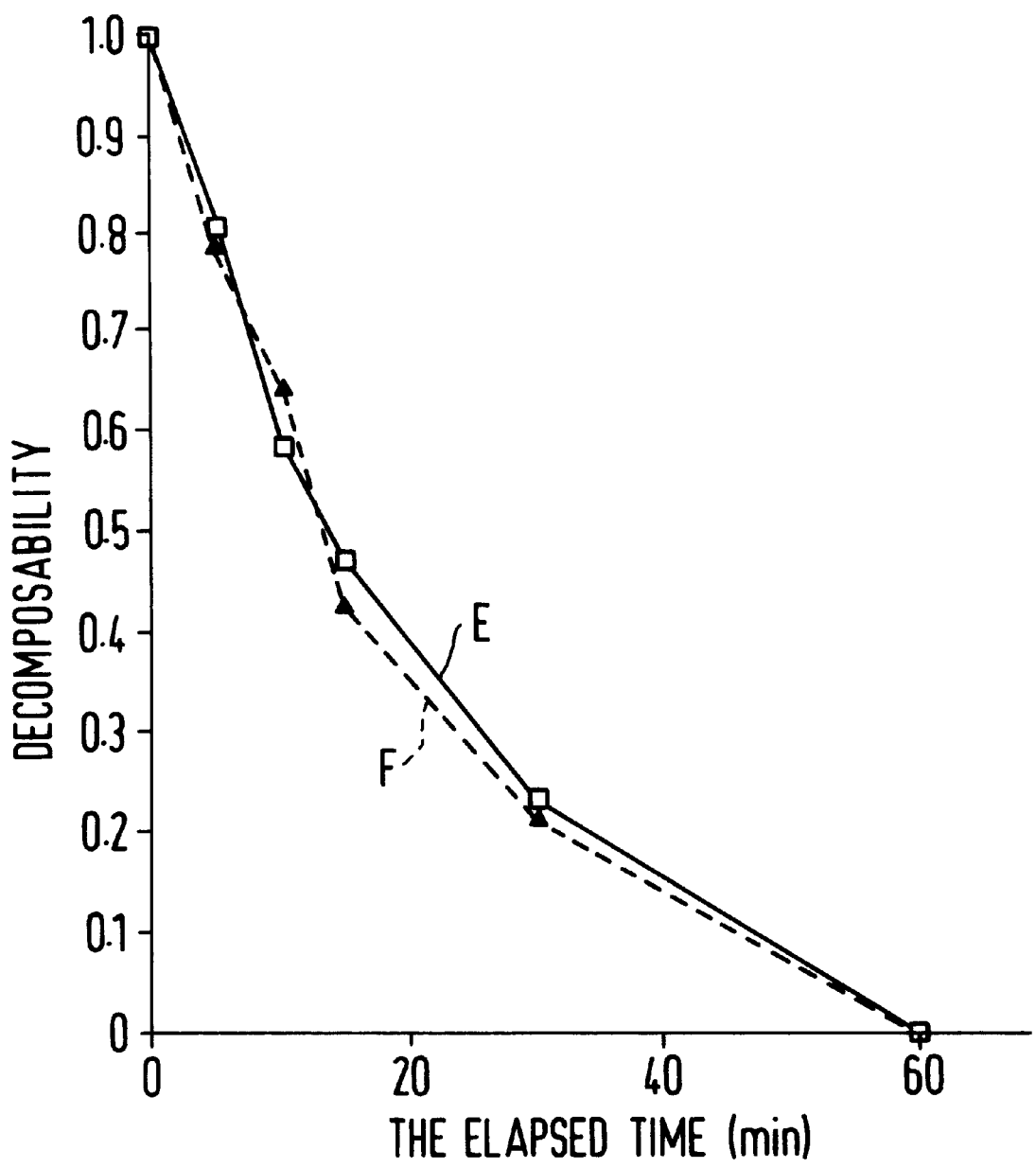
FIG. 11 is a graph showing the measured result of the ink decomposability of the photocatalyzer according to the fourth embodiment.

FIG. 11 is a graph showing the measured result of the ink decomposability characteristic in the fourth embodiment of the photocatalyzer of the present invention together with that of the comparison example. The x-axis indicates elapse time (minute and the y-axis indicates decomposability The curves E and F indicate the photocatalyzer in this embodiment and a conventional one, respectively. As clearly seen from the figure, the photocatalytic action is almost the same as that of the conventional photocatalyzer.

Figure 12:
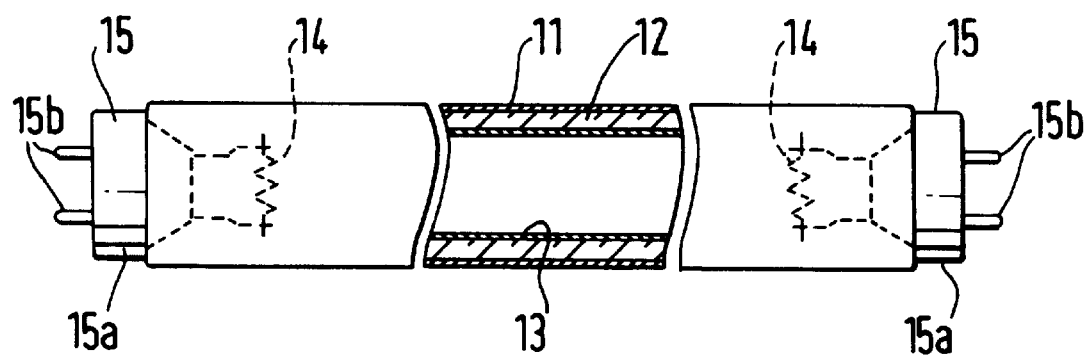
FIG. 12 is a essential part sectional front view of a fluorescent lamp according to the present invention.

FIG. 12 is an essential part sectional front view showing a fluorescent lamp according to an embodiment of the present invention. Reference numeral 11 denotes a glass bulb, 12 is a photocatalytic membrane, 13 is a fluorescent material layer, 14 is a filament electrode and 15 is a base. The glass bulb 11 functions as a base body to the photocatalytic membrane 12 and houses the functional parts as a fluorescent lamp in its inside in the airtight state. Rare gas comprising mainly mercury and argon is charged at several Torr as a discharge medium in the glass bulb 11, the fluorescent material layer 13 is supported on the inner surface and further, a pair of filament electrodes 14 are provided at both sides.

The base 15 comprises an aluminum made cap-shaped base body 15a and a pair of base pins 15b insulated and mounted to the base body 15a, and adhered to both ends of the glass bulb 11. Both ends of the filament electrodes 14 are connected to the base pins 15b, respectively. When the fluorescent lamp of this embodiment is lighted, organic contaminants adhered on the surface of the fluorescent lamp are decomposed and offensive materials in the contacting air are decomposed by the photocatalytic action of the photocatalytic membrane 12 and odor in the circumferential area is deodrized. A lamp according to this invention can utilize such a fluorescent lamp or other suitable means for generating light. For example, the lamp could be of the type that has electrodes, or could be electrodeless. As another example, the lamp could be a neon lamp, a xenon lamp, a lamp without phosphors that generate light using only gas contained within the glass bulb.

Figure 13:
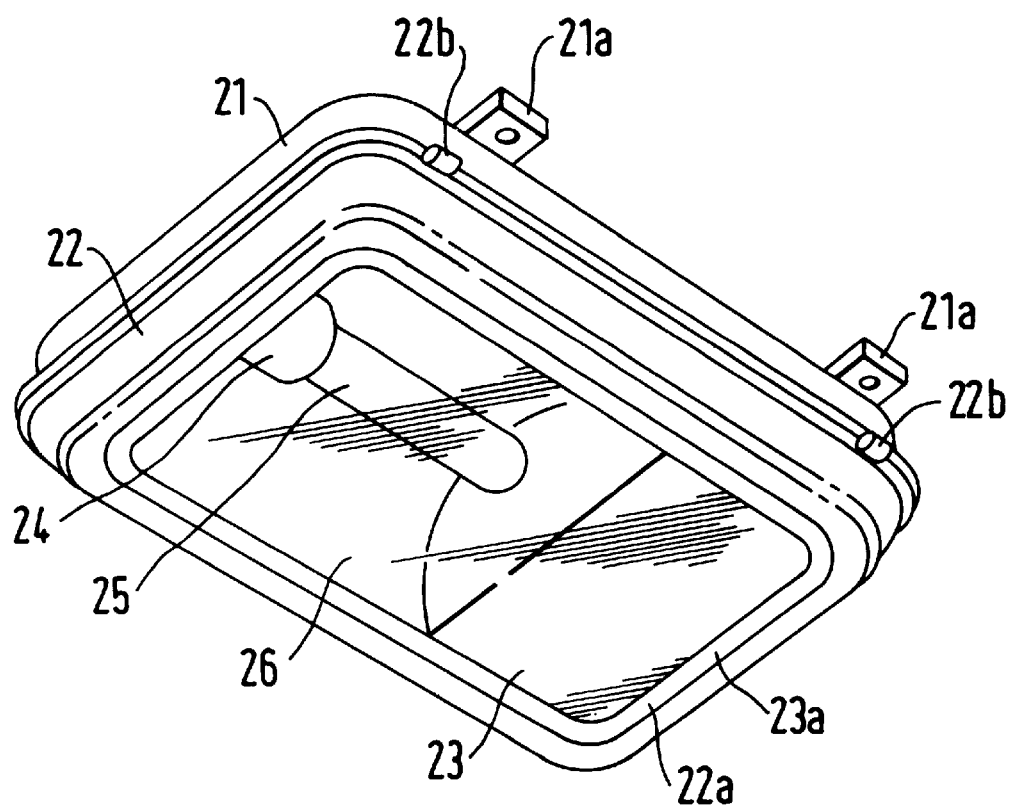
FIG. 13 is a perspective view showing a lighting fixture for use in tunnels according to the present invention.

FIG. 13 is a perspective view showing a lighting fixture for use in tunnels in an embodiment of the lighting fixture of the present invention. Reference numeral 21 denotes a main body of a lighting fixture, 22 is a front frame, 23 is a translucent glass cover, 24 is a lamp socket, 25 is a high-tension discharge lamp and 26 is a reflecting plate. Lighting fixture main body 21 is formed in a box shape using a stainless steel plate with an opening provided on the front and a mounting fitting 21a on the back. The front frame 22 is formed using a stainless steel plate and provided with a projecting opening 22a at the center, hinges 22b at one side and a latch (not shown) at the other side. The front frame is attached to one side of the front panel of the main body 21 of the lighting fixture by the hinges 22b so that it can be opened/closed and fixed at the closed position by the latch. The translucent glass cover 23 is mounted to the front frame 22 via a silicone rubber made packing 23a for waterproof. This translucent glass cover 23 transmits the visible light and has a relatively high transmission factor characteristic at least at a part of the ultraviolet area of wavelength below 400 nm. Further, the photocatalytic member, shown in FIG. 1, is formed on the front panel of the translucent glass cover 23. The lamp socket 24 is installed in the main body 21 of the lighting fixture. The high-tension discharge lamp 25 emits ultraviolet rays of intensity above 0.05W per luminous flux of visible ray 1000 lm in the range of wavelength 340~400 nm.

The reflecting plate 26 is provided in the lighting fixture main body 21 so that the light emitted from the above-mentioned high-tension discharge lamp 25 is reflected on the reflecting plate 26 and shows a required luminous intensity distribution characteristic. On the back side of the reflecting plate 26 of the lighting fixture main body 21, there are provided a ballast, a terminal board, etc.

The lighting fixture of this embodiment is installed in a tunnel via the mounting fitting 21a for illuminating the inside of the tunnel. In addition, the ultraviolet rays mainly in the range of wavelength 340~400 nm emitted from the high-tension discharge lamp 25 simultaneously with the illumination passes through the translucent glass cover 23 together with the visible rays and enters into the photocatalytic membrane and so, the photocatalytic membrane is activated by the ultraviolet rays and performs the self-cleaning by decomposing organic contamination such as adhered soot and smoke, etc.

Figure 14:
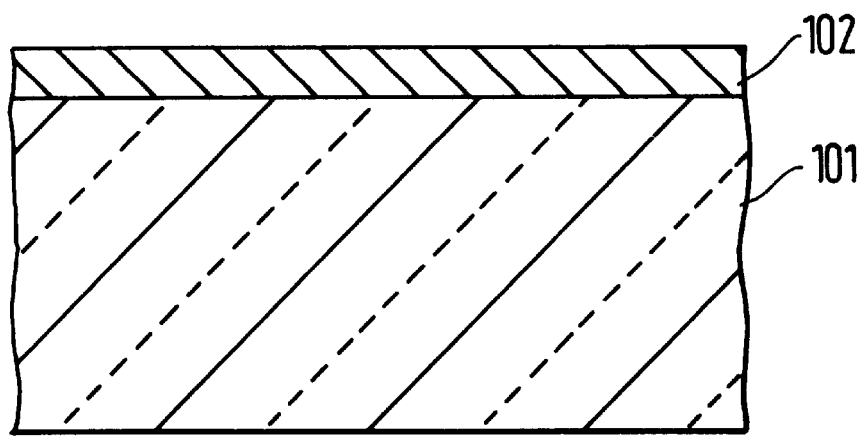
FIG. 14 is a conceptual essential part expanded sectional view of a fifth embodiment of a photocatalyzer of the present invention.

FIG. 14 is a conceptual essential part enlarged sectional view of the photocatalyzer according to fifth embodiment of the present invention. Reference numeral 101 denotes a base body and 102 is a photocatalytic membrane. The base body 101 comprises a quartz glass. The photocatalytic membrane 102 comprises a photocatalytic material comprising mainly titanium oxide added with silica as a metallic oxide.

Next, the photocatalytic membrane manufacturing method will be explained Mix a reaction liquid of titanium alkoxide and a chelating agent such as acetylacetone with a liquid of silicon compound such as polysiloxane diluted by organic solvent such as ethanol at a weight ratio 9:1~5:5 and regulate a coating liquid. In this case, however, the coating liquid must satisfy the condition that the hydrolysis speed of silicon compound is faster than that of titanium alkoxide and solubility of the silicon compound in the gel state in a solvent is low. Next, dip a base body in a coating liquid and pull it up. After pulled up, bake the base body at 400~600° C. As the result of above processes, the photocatalytic membrane obtained on the surface of the base body contains much silica in the area of the base body side and less in the area at the surface side.

Figure 15:
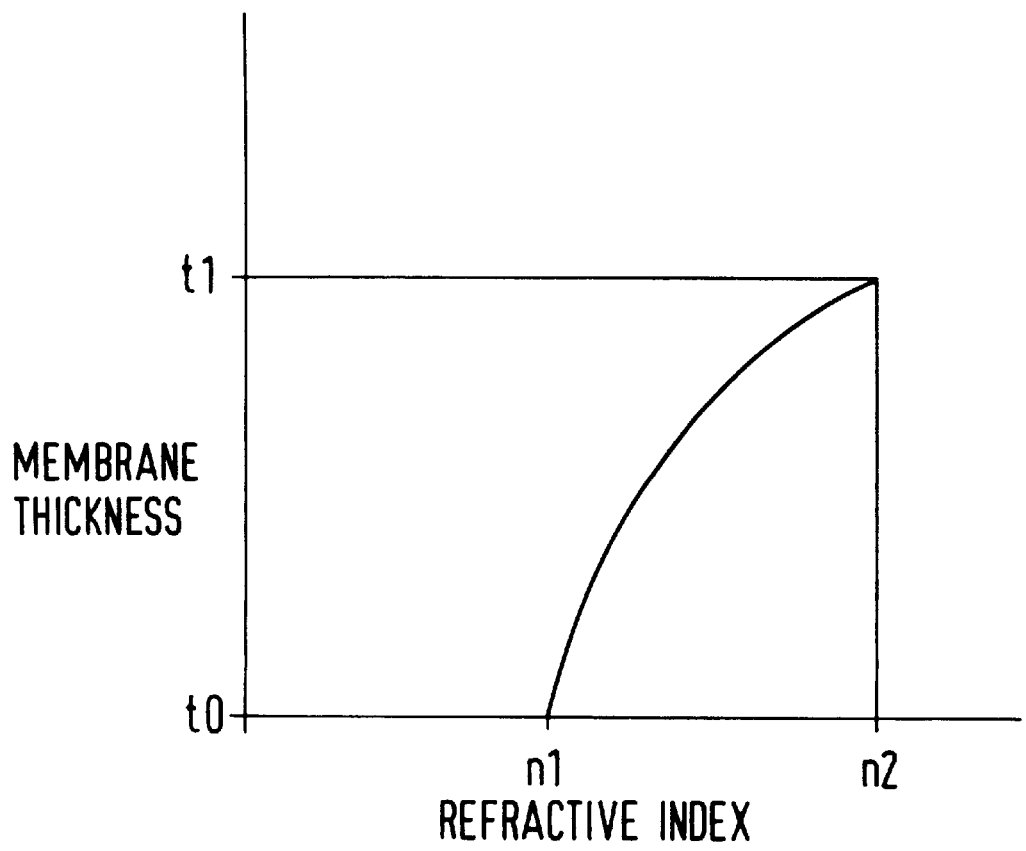
FIG. 15 is a graph conceptually showing the change of refractive index in the direction of thickness of the membrane of the photocatalyzer of the fifth embodiment.

FIG. 15 is a graph conceptually showing the change in the refractive index of the photocatalyzer, according to the fifth embodiment of the invention, in the direction of thickness of the photocatalytic membrane obtained from the above-mentioned manufacturing method and the refractive index changes consecutively. The x-axis shows refractive index and the y-axis shows membrane thickness, respectively. The position of the membrane thickness t0 indicates the interface with the base body and the position t1 indicates the surface of the photocatalytic membrane, respectively. Further, n1 indicates the refractive index of the photocatalytic membrane at the interface position and n2 indicates the refractive index of the surface. The refractive index n2 is larger than n1.

Figure 16:
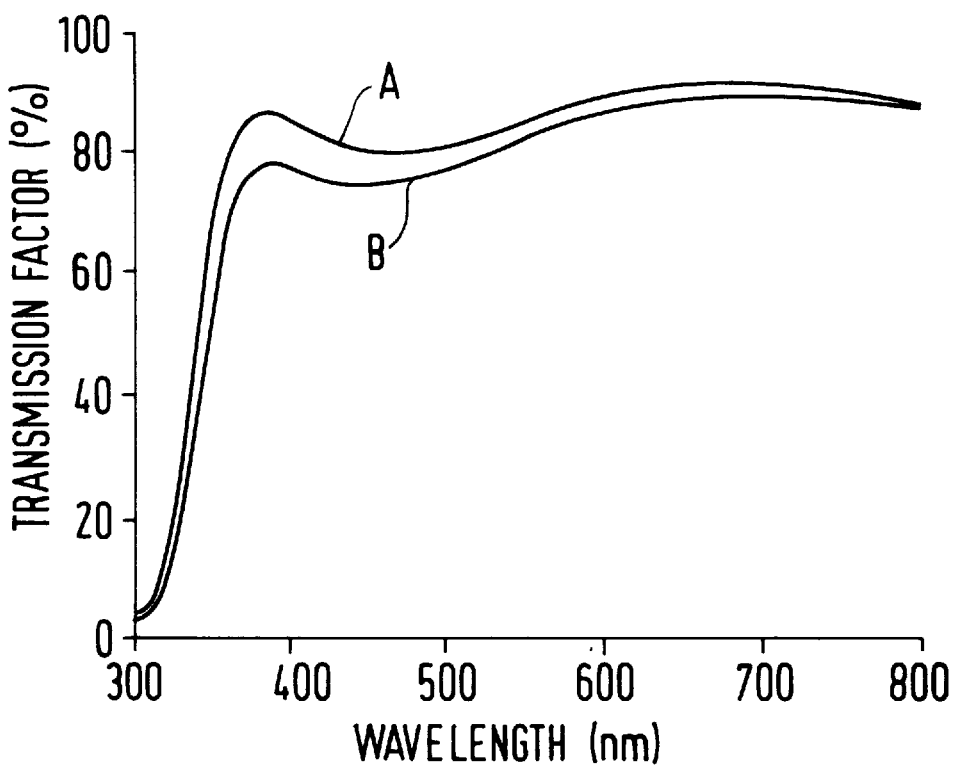
FIG. 16 is a graph conceptually showing the spectral transmission factor characteristic of the photocatalytic membrane of the photocatalyzer of the fifth embodiment together with that of a conventional example.

FIG. 16 is a graph showing the spectral transmission factor characteristic of the photocatalytic membrane of the photocatalyzer in the fifth embodiment of the present invention and that of a conventional example. The x-axis indicates wavelength (nm) and the y-axis indicates transmission factor (%). Curve A indicates the spectral transmission factor characteristic of the photocatalytic membrane in this embodiment. Curve B indicates the similar characteristic of a conventional example. When curves A and B are compared, it is evident that the transmission factor in the visible rays and ultraviolet area is improved according to this embodiment.

A sixth embodiment of the present invention will now be explained. The photocatalytic membrane is formed by applying a coating liquid containing titanium alkoxide to a base body made of quartz glass and after baking it, by adding a metallic oxide selected from a group of aluminum Al, tin Sn and tantalum Ta. When forming the photocatalytic membrane, solve titanium alkoxide in a mixed solvent of acetaldehyde and ethanol at 3~10 wt % and regulate a coating liquid obtained as mentioned above by adding tinisoproxide at 2 wt % as a metallic compound.

Then, apply a coating liquid to the base body and by baking it at 500~600° C., form an about 150 nm thick photocatalytic membrane. When the refractive index at the wavelength 550 nm of the obtained photocatalyzer was measured, it was about 1.95. Further, the refractive index of a conventional photocatalytic membrane is about 2.2.

Figure 17:
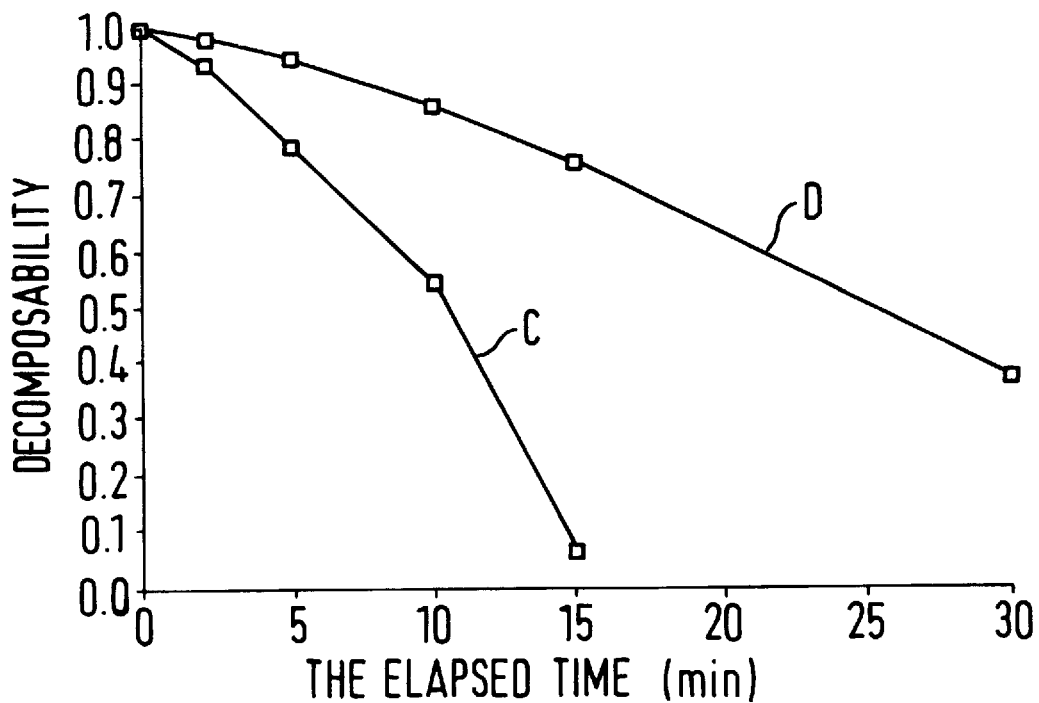
FIG. 17 is a graph showing the measured result of the ink decomposability of the photocatalyzer according to a sixth embodiment of the invention together with that of a convention example.

Next, the measured result of ink decomposability of the obtained photocatalyzer is shown in FIG. 17.

FIG. 17 is a graph showing the measured result of ink decomposability of the photocatalyzer according to the sixth embodiment of the present invention and that of a conventional example. The x-axis indicated the elapsed time (minutes) and the y-axis indicates decomposability. Curve C indicates the decomposition characteristic in this embodiment. Curve D indicates the decomposition characteristic in a conventional example. Further, in the conventional example, the photocatalyzer was manufactured under the same condition as this embodiment except that no metallic oxide was contained. As clearly seen from the comparison of curves C and D, according to this embodiment, the photocatalytic action is extremely excellent.

Figure 18:
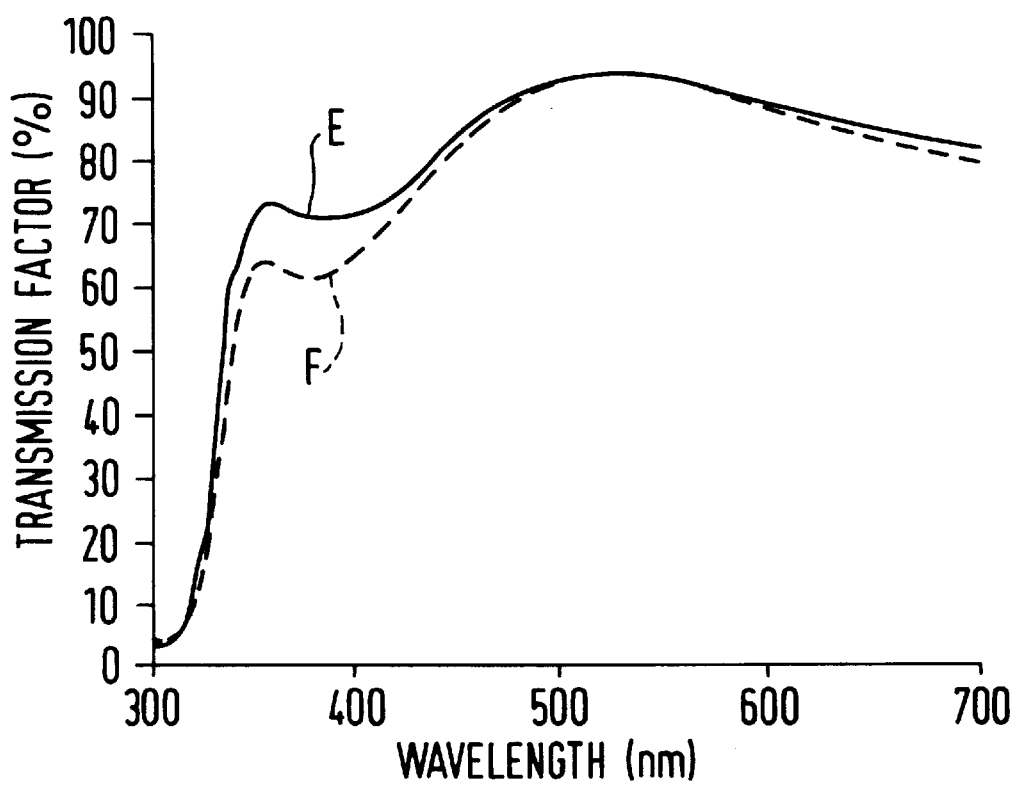
FIG. 18 is a graph showing the spectral transmission factor characteristic of the photocatalytic membrane of the photocatalyzer according to a sixth embodiment of the present invention together with that of a conventional example.

FIG. 18 is a graph showing the spectral transmission factor characteristic of the photocatalytic membrane in the sixth embodiment of the photocatalyzer of the present invention together with that of a conventional example. The x-axis indicates the wavelength (nm) and the y-axis indicates the transmission factor (%).

Curve E indicates the spectral transmission factor characteristic of the photocatalytic membrane in this embodiment and the curve F indicates the similar characteristic in a conventional example. As clearly seen from the comparison of curves E and F, according to this embodiment, the transmission factor is improved mainly in the ultraviolet area and the short wavelength visible area.

Figure 19:
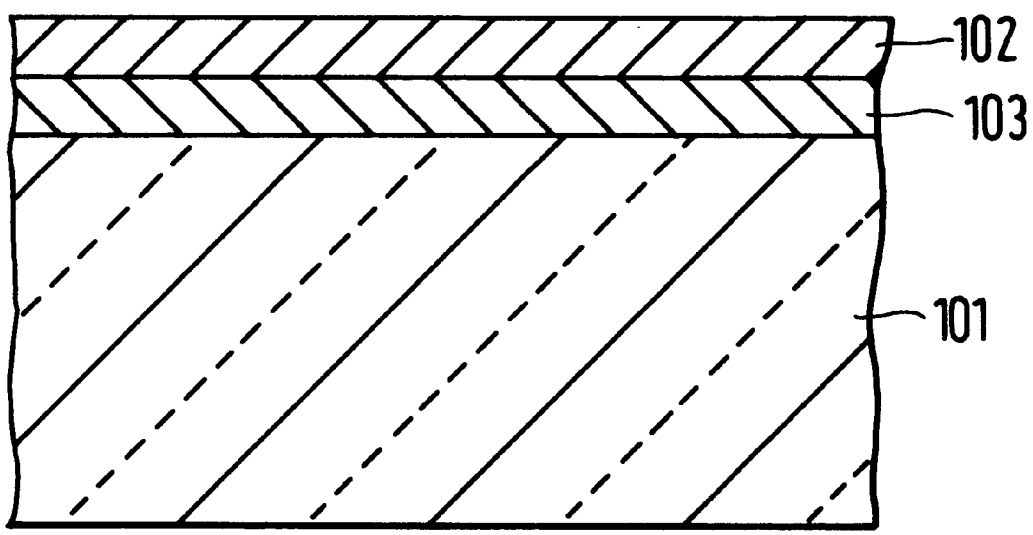
FIG. 19 is a conceptual essential part enlarged sectional view showing a seventh embodiment of a photocatalyzer according to the present invention.

FIG. 19 is a conceptual essential part enlarged sectional view showing the seventh embodiment of the photocatalyzer of the present invention. Reference numeral 101 represents a base body, 102 is a photocatalytic membrane and 103 is a ground layer. The base body 101 and the photocatalytic membrane 102 are in the specification similar to the fifth embodiment. The ground layer 103 is made principally of silica, containing OH for silica. The ground layer 103 was manufactured according to the following method.

A coating liquid was obtained by adding water to a solution of ethanol solving siliconethoxide at 3 wt %. By applying about 200 nm coating liquid to a base body and further applying a coating liquid similar to that in the sixth embodiment added with 2 wt % tantalum for oxide of tin, the base body was baked at about 500~600° C. and an about 150 nm thick photocatalytic membrane was formed. Further, as a comparison example, a base body applied with a coating liquid for the grounding layer was baked at about 1000° C. and then, applying the same photocatalytic membrane coating liquid and baking it at the same condition, a photocatalyzer was manufactured.

Figure 20:
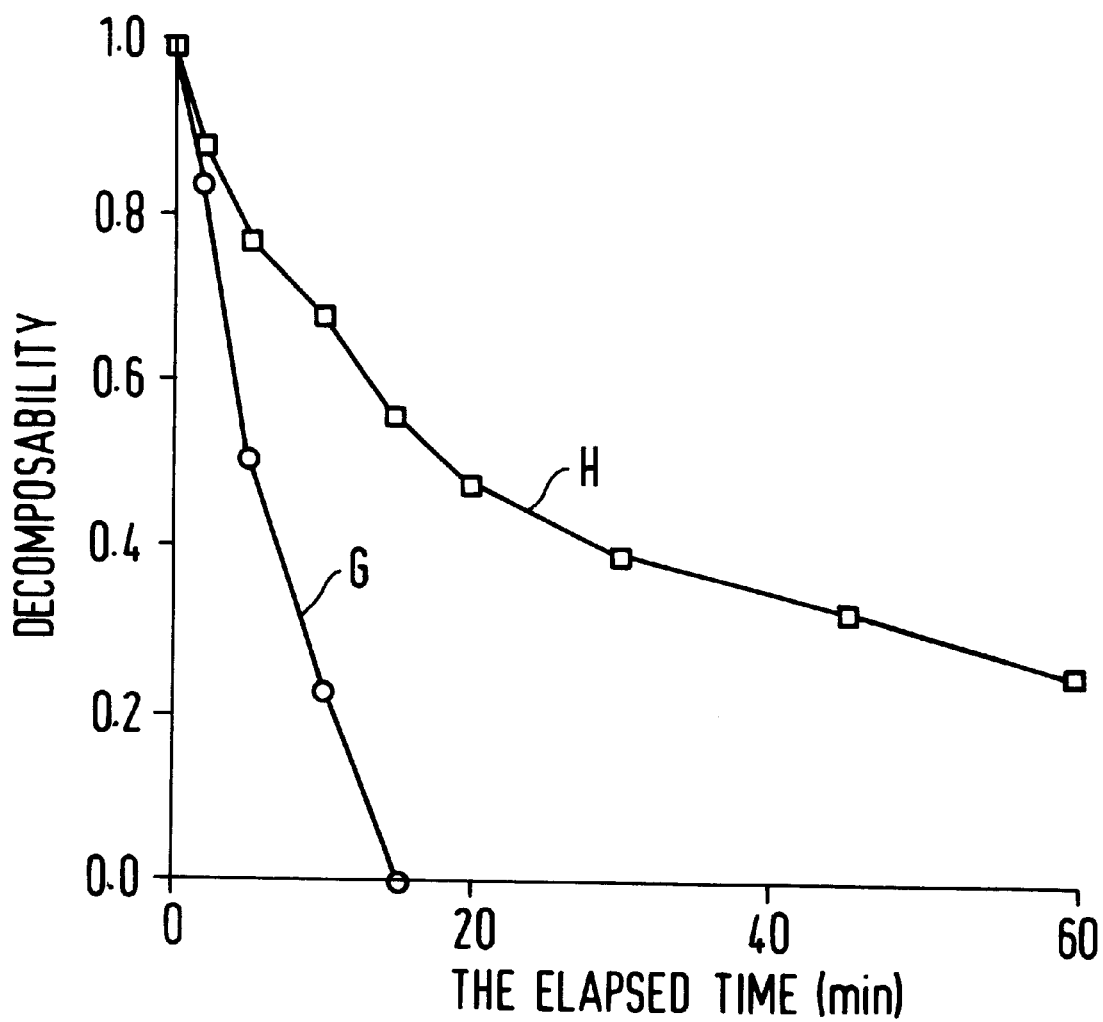
FIG. 20 is a graph showing the ink decomposability of the photocatalyzer according to the seventh embodiment together with that of a comparison example.

FIG. 20 is a graph showing ink decomposability of the photocatalyzer in the seventh embodiment of the present invention together with that of the comparison example. The x-axis indicates elapsed time (minute) and the y-axis indicates decomposability. Curve G indicates decomposability in this embodiment and the curve H indicates decomposability in the comparison example. As clearly seen when compared both curves, according to this embodiment, the excellent photocatalyzer performance.

While the invention has been described in connection with what are presently considered to be the most practical and preferred embodiments, it is to be understood that the invention is not limited to the disclosed embodiments. On the contrary, it is intended to cover various modifications and equivalent arrangements included within the spirit and scope of the appended claims.

What is claimed is:

1. A photocatalyzer comprising:
   a base body;
   a ground layer formed on the base body, the ground layer comprising a metallic oxide having an uneven surface; and a photocatalytic membrane formed on the uneven surface of the ground layer, the membrane being made of mainly ultra fine particles of titanium oxide, formed by entering into portions of the uneven surface of the ground layer and being closely fitted thereto;

wherein the average depth of the uneven surface of the ground layer is larger than the average particle size of ultra fine particles of titanium oxide of the photocatalytic membrane.

2. A photocatalyzer as set forth in claim 1, wherein the average depth of the uneven surface of the ground layer is 20 to 150 nm; and the average particle size of ultra fine particles of titanium oxide of the photocatalytic membrane is 1 to 20 nm.

3. A photocatalyzer comprising:

a base body;

a ground layer formed on the base body, the ground layer comprising a metallic oxide having an uneven surface; and a photocatalytic membrane formed on the uneven surface of the ground layer, the membrane being made of mainly ultra fine particles of titanium oxide, formed by entering into portions of the uneven surface of the ground layer and being closely fitted thereto;

wherein the ground layer has concave portions that penetrate to the surface of the base body, and a part of the photocatalytic membrane fills the concave portion.

4. A photocatalyzer comprising:

a base body;

a ground layer formed on the base body, the ground layer comprising a metallic oxide having an uneven surface; and a photocatalytic membrane formed on the uneven surface of the ground layer, the membrane being made of mainly ultra fine particles of titanium oxide, formed by entering into portions of the uneven surface of the ground layer and being closely fitted thereto;

wherein the ground layer comprises a mixture of silicon oxide and titanium oxide mixed at a weight ratio 40:60 to 80:20.

5. A photocatalyzer comprising:

a base body, and a photocatalyzer membrane formed on the base body such that the membrane has a base body side facing the base body and a surface side facing away from the base body, the membrane being made of a photocatalytic material comprising titanium oxides as a principal constituent mixed with metallic oxide, the metallic oxide content being greater on the base body side of the membrane than it is on the surface side.

* * * * *